R. P. BROWN.
CLAMPING DEVICE FOR MEASURING INSTRUMENTS.
APPLICATION FILED JULY 13, 1921.

1,436,430.

Patented Nov. 21, 1922.

WITNESS
F. J. Hartman.

INVENTOR
Richard P. Brown.
BY Robert M. Barr.
ATTORNEY

Patented Nov. 21, 1922.

1,436,430

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

CLAMPING DEVICE FOR MEASURING INSTRUMENTS.

Application filed July 13, 1921. Serial No. 484,518.

*To all whom it may concern:*

Be it known that I, RICHARD P. BROWN, a citizen of the United States, and a resident of Philadelphia, county of Philadelphia, State of Pennsylvania, have invented certain new and useful Improvements in Clamping Devices for Measuring Instruments, of which the following is a specification.

Some of the objects of the present invention are to provide means for clamping an apertured sheet of material in position upon an associated part while said clamping means is in assembled condition; to provide means for clamping and unclamping an instrument chart without removing any part of the clamping means; to provide a fastening means including a chart knob arranged in one position to permit an apertured chart or sheet of material to be slipped over the knob and in another position to clamp and prevent the removal of said chart or sheet of material; to provide a non-removable chart knob for clamping record charts in operative position; to provide an improved clamping device; to provide means for preventing the detachment and loss of chart knobs; and to provide other improvements as will hereinafter appear.

Figure 1:
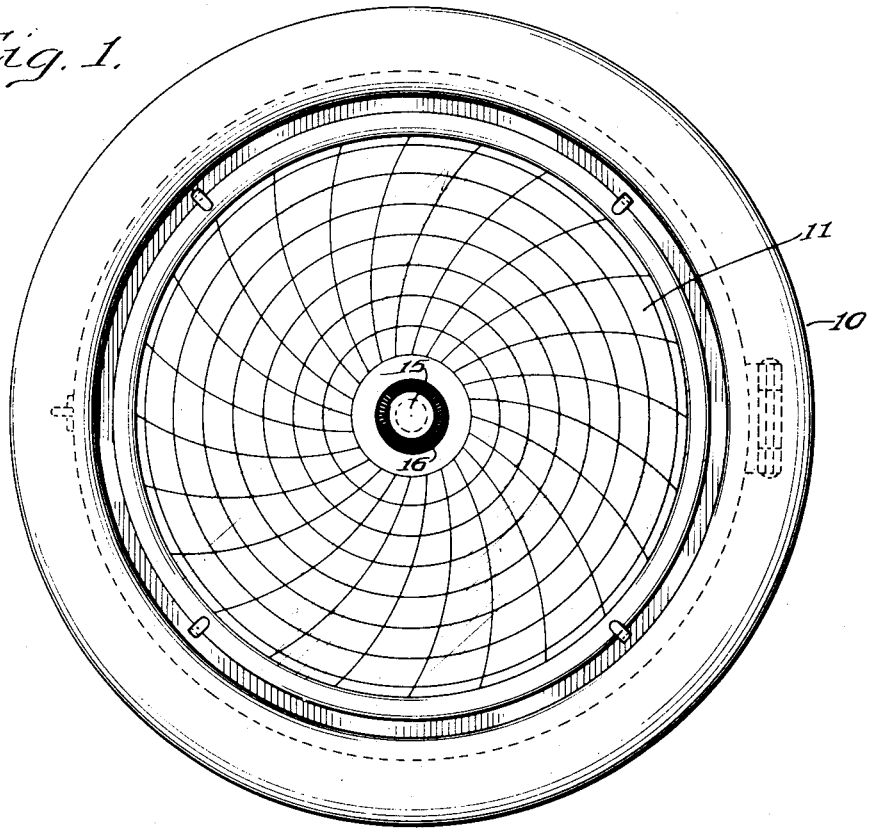
Figure 2:
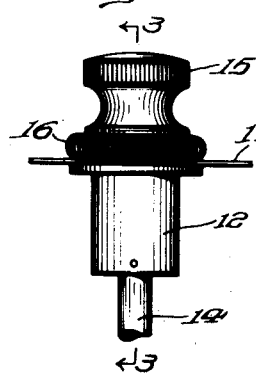
Figure 3:
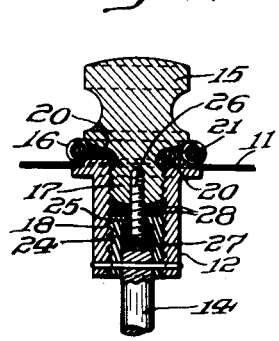
Figure 4:
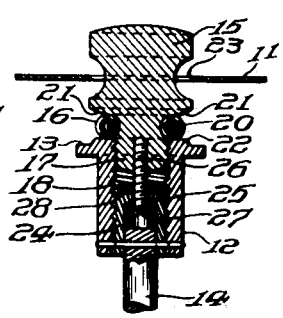

In the accompanying drawings, Fig. 1 represents a face elevation of a recording instrument having a chart clamping means embodying one form of the present invention; Fig. 2 represents an elevation of a clamping device embodying one form of the present invention in clamping position; Fig. 3 represents a section on line 3—3 of Fig. 2; and Fig. 4 represents a similar section showing the parts in releasing position.

Referring to the drawings, one form of the invention is shown in Fig. 1 as applied to a recording instrument 10 for the purpose of securing the chart 11 in proper position and preventing movement or displacement of the said chart during the operation of the instrument. It will be understood, however, that this is but one of the many applications of the invention in practice.

For supporting the part to be clamped, a pedestal member or support 12 is provided having a face 13 upon which the part to be clamped seats and is held fast in the required manner. In the present construction, which is shown by way of example, the member 12 is pinned or otherwise rigidly secured to a shaft or axis 14 of a recording instrument and the chart 11 has its central portion resting upon the face 13.

In order to clamp the chart 11 upon the pedestal member 12, a knob member 15 and an annular coil spring 16 are preferably provided, the former having a relatively short exteriorly threaded stem 17 arranged for threaded engagement with a threaded bore 18 in the pedestal member 12. The diameter of the stem 17 is less than the diameter of the body of the knob 15 by an amount sufficient to allow the coil spring 16 to lie entirely within the diametrical boundaries of the knob 15 when the spring is not under tension, as shown in Fig. 4. The stem 17 is provided with a groove 20, preferably curved to conform to the contour of the spring coils, and merges at one side into the curved lower face 21 of the body of the knob 15. The curvature of the face 21 is such that the portion of the coil spring 16 abutting the knob 15 rides freely over its surface, when the spring is either expanding or contracting. The opposite portion of the coil spring 16 rides upon a coaxially arranged circular shoulder 22 projecting from the face 13 and having an outer diameter substantially corresponding to the opening 23 in the center of the chart 11 to accurately center said chart. The arrangement is such that the chart 11 can be freely placed over the shoulder 22 to seat on the face 13 without removing the knob 15 or its associated parts, because, when the parts are in the position shown in Fig. 4, the chart opening 23 allows the knob 15 to pass therethrough. When the chart 11 is seated upon the face 13 it can be clamped tight by turning the knob 15 towards the member 12, whereupon the face 21 and shoulder 22 cause the coil spring 16 to expand, thus enlarging its diameter to such an extent as to overlap the chart 11 and hold it fast in the manner required as shown in Fig. 3.

As a means for securing the knob 15 to the member 12 so that it cannot be removed therefrom, but is still free, to cause the necessary clamping action, a bushing 24 is threaded axially into the member 12 and provided with an axial opening 25 through which a screw 26 passes for threaded engagement with the stem 17 of the knob 15. The screw 26 is free to slide in the opening 25 and has a length projecting sufficient to permit the desired axial movement of the knob 15 relative to the member 12, while the screw head 27 limits the outward movement of the knob 15. If desired washers 28 may be interposed between the end of the stem 17 and the bushing 24 as will be understood.

From the foregoing it will be apparent that a clamping device has been provided whereby a part or element to be clamped can be placed in position and rigidly held without disconnecting or removing any part which serves to produce the clamping action. While the device can be employed for clamping various elements, it is more particularly useful in connection with the securing of charts, or record elements, in measuring, indicating or recording instruments. In such instruments the record discs or charts are periodically replaced by a fresh or blank disc or chart and it has been customary to clamp them in place by a knob which is removable for the purpose. As a result of using removable knobs, these instruments are often rendered temporarily useless by the loss or misplacing of the respective knobs during the change from one chart to another, and this has become of such frequent occurrence, through unskilled and careless workmen, as to seriously interfere with the collection of the desired data.

By the present invention this disadvantage is entirely removed because the clamping knob 15 is at all times connected to the instrument pedestal which carries the chart. When it is desired to replace a chart, the knob 15 is turned in a direction to feed the knob 15 away from the member 12 and as this movement takes place, the coil spring 16 retracts and finally assumes the position, shown in Fig. 4, well within the confines of the knob diameter. The chart 11 can now be lifted off axially of the knob 15 because the diameter of the latter is less than the diameter of the chart opening 23. A fresh chart can now be put on over the knob 15 and seated upon the face 13 of the pedestal member 12. The knob 15 is now turned in the opposite direction to feed the knob 15 towards the shoulder 22, whereupon the spring 16 is forced outwardly between the two faces 21 and 22 and is finally held rigidly clamped against the chart 11, as shown in Fig. 3.

While a coil spring has been here described as one of the clamping elements it will be understood that various other expansible or movable elements may be employed to perform the function required and the invention is not to be limited to the exact details here shown. Also it will be understood that the term "knob" is used in a broad, generic sense and any other equivalent structure may be employed without departing from the invention.

Having thus described my invention, I claim:

1. A device of the character stated, comprising a support for an apertured chart, a knob of less diameter than the aperture in said chart adjustably connected to said support and having a peripheral groove therein, and a coiled spring seating in said groove, said spring in retracted position having a less diameter than the aperture in said chart, and in expanded position a diameter greater than the diameter of said aperture, whereby said chart is freely removable from said support without removing said knob when said spring is retracted and is clamped when said spring is expanded.

2. A device of the character stated, comprising a knob having a body portion arranged to pass through the aperture in a record chart, and having also a shank of less diameter than said body portion, a support for said chart, means for adjustably connecting said shank to said support, and a coiled spring encircling said shank and arranged to be expanded between said body and said support by clamping action, said spring in retracted position having a diameter less than the aperture in said chart, and in expanded position having a diameter greater than the diameter of said aperture, whereby said chart is clamped in operative position.

Signed at Philadelphia, in the county of Philadelphia, State of Pennsylvania, this 8th day of July, 1921.

RICHARD P. BROWN.